(12) United States Patent
Otani et al.

(10) Patent No.: US 11,073,949 B2
(45) Date of Patent: Jul. 27, 2021

(54) DISPLAY METHOD, DISPLAY DEVICE, AND INTERACTIVE PROJECTOR CONFIGURED TO RECEIVE AN OPERATION TO AN OPERATION SURFACE BY A HAND OF A USER

(71) Applicant: SEIKO EPSON CORPORATION, Tokyo (JP)

(72) Inventors: Makoto Otani, Matsumoto (JP); Akira Ikeda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/789,629

(22) Filed: Feb. 13, 2020

(65) Prior Publication Data

US 2020/0264729 A1    Aug. 20, 2020

(30) Foreign Application Priority Data

Feb. 14, 2019    (JP) .............................. JP2019-024341

(51) Int. Cl.
| | |
|---|---|
| *G06F 3/042* | (2006.01) |
| *G06K 9/00* | (2006.01) |
| *G06F 3/0488* | (2013.01) |
| *G06F 3/0484* | (2013.01) |
| *G06F 3/0481* | (2013.01) |

(52) U.S. Cl.
CPC .......... *G06F 3/0425* (2013.01); *G06F 3/0488* (2013.01); *G06F 3/04817* (2013.01); *G06F 3/04845* (2013.01); *G06K 9/00375* (2013.01); *G06F 3/042* (2013.01); *G06F 3/04812* (2013.01); *G06F 2203/04101* (2013.01)

(58) Field of Classification Search
CPC .. G06F 3/0425; G06F 3/0488; G06F 3/04845; G06F 3/0417; G06F 3/042; G06F 3/04812; G06F 2203/04101; G06K 9/00375

See application file for complete search history.

(56) References Cited

U.S. PATENT DOCUMENTS

| | | | | |
|---|---|---|---|---|
| 10,281,987 | B1* | 5/2019 | Yang | G06F 3/0304 |
| 2001/0012001 | A1* | 8/2001 | Rekimoto | G06F 3/0425 |
| | | | | 345/173 |
| 2012/0249422 | A1* | 10/2012 | Tse | G06F 3/0304 |
| | | | | 345/158 |
| 2012/0299862 | A1 | 11/2012 | Matsumoto et al. | |
| 2016/0034039 | A1 | 2/2016 | Maeda et al. | |
| 2017/0329458 | A1* | 11/2017 | Kanemaru | G06F 3/0425 |

FOREIGN PATENT DOCUMENTS

| | | |
|---|---|---|
| JP | 2014-186361 A | 10/2014 |
| JP | 2017-162126 A | 9/2017 |
| WO | 2012/104951 A1 | 8/2012 |

* cited by examiner

*Primary Examiner* — Adam J Snyder
(74) *Attorney, Agent, or Firm* — Dority & Manning, P.A.

(57) ABSTRACT

A display method includes (a) capturing an image including a hand, (b) determining a first distance as a distance between the hand and an operation surface, (c) recognizing a shape of the hand based on the image, and (d) displaying an operation icon selected in accordance with the shape of the hand out of a plurality of operation icons on the operation surface in a case of a separate state in which the first distance exceeds a first distance threshold value determined in advance.

16 Claims, 9 Drawing Sheets

FIG. 10

DISPLAY METHOD, DISPLAY DEVICE, AND INTERACTIVE PROJECTOR CONFIGURED TO RECEIVE AN OPERATION TO AN OPERATION SURFACE BY A HAND OF A USER The present application is based on, and claims priority from JP Application Serial Number 2019-024341, filed Feb. 14, 2019, the disclosure of which is hereby incorporated by reference herein in its entirety.

BACKGROUND

1. Technical Field

The present disclosure relates to a technology of receiving an operation to an operation surface with a hand of a user to display an image.

2. Related Art

In JP-A-2017-162126, there is disclosed a system for changing a processing content in accordance with a shape of the hand. Specifically, when it has been detected that the number of the fingertips has been one, a notice that a touch in a pointing posture occurs is given, and a process corresponding to the pointing posture is performed. In contrast, when five fingertips have been detected, and it has been determined that the touch operation has been performed in a posture other than the pointing posture, another process is performed.

However, in the related art, it is necessary for the user to memorize all of the relationships between the shapes of the hand and the processing contents corresponding to the shapes in advance, and there is a problem that the relationships between the shapes of the hand and the processing contents cannot easily be realized.

SUMMARY

According to an aspect of the present disclosure, there is provided a display method of receiving an operation to an operation surface with a hand of a user. The display method includes (a) capturing an image including the hand, (b) determining a first distance as a distance between the hand and the operation surface, (c) recognizing a shape of the hand based on the image, and (d) displaying an operation icon selected in accordance with the shape of the hand out of a plurality of operation icons on the operation surface in a case of a separate state in which the first distance exceeds a first distance threshold value determined in advance.

The present disclosure can be realized in a variety of aspects other than the display method, such as a display device or an interactive projector, a computer program for realizing the method or a function of the device thereof, or a nonvolatile recording medium or the like storing the computer program.

DESCRIPTION OF EXEMPLARY EMBODIMENTS

A. First Embodiment

Figure 1:
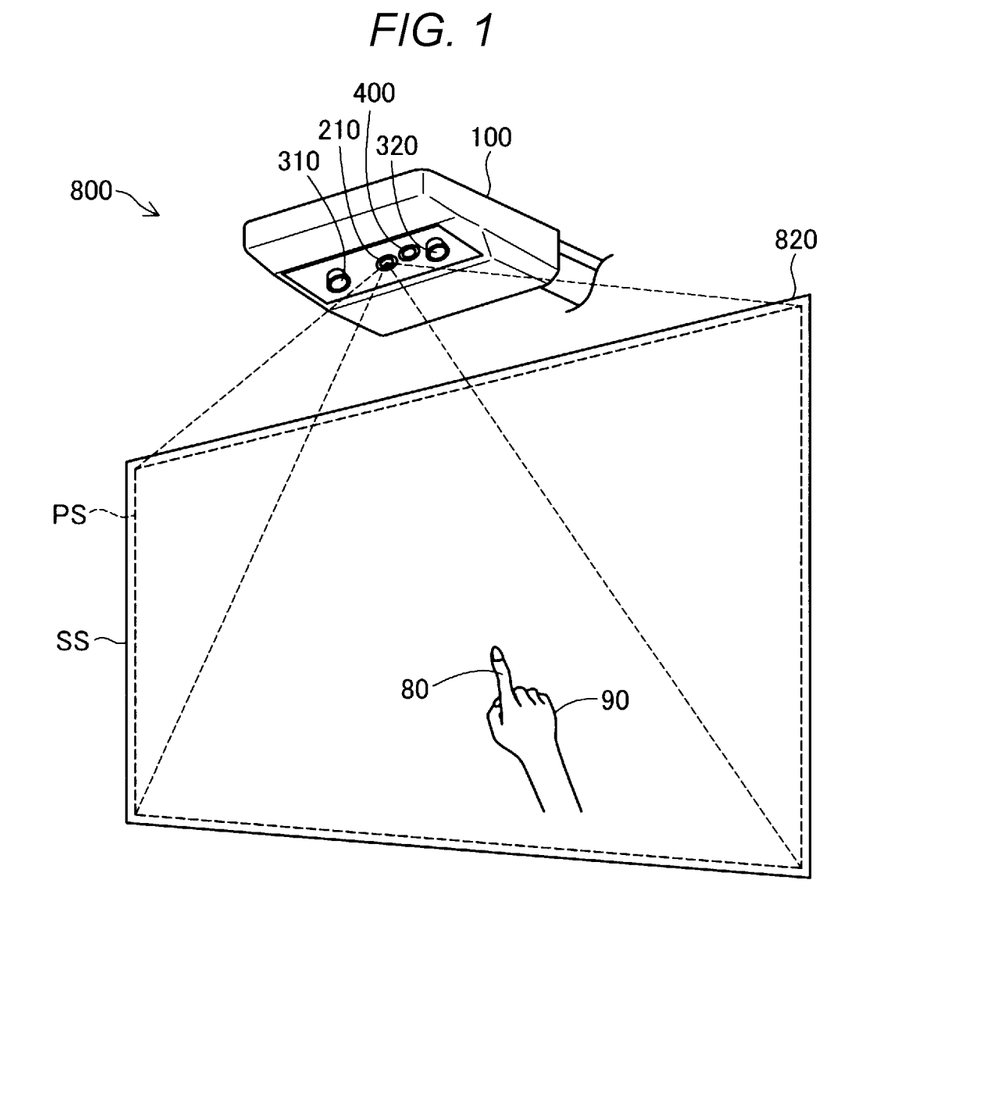
FIG. 1 is a perspective view of an interactive projection system according to a first embodiment.

FIG. 1 is a perspective view of an interactive projection system 800 in a first embodiment. The system 800 has an interactive projector 100 and a screen plate 820. A front surface of the screen plate 820 is used as an operation surface SS to be used for inputting an instruction using a hand 90 or a finger 80 of the user. It should be noted that in the present embodiment, the finger 80 and the hand 90 are also called a "pointing body." The operation surface SS is also used as a projection surface on which a projected screen PS is projected. The projector 100 is fixed to a wall surface, and is installed in front of and above the screen plate 820. It should be noted that although the operation surface SS is vertically arranged in FIG. 1, it is also possible to use the system 800 with the operation surface SS arranged horizontally.

The projector 100 has a projection lens 210 for projecting an image on the screen plate 820, two cameras 310, 320 for capturing the image including the hand 90, and an infrared illumination section 400. In the present embodiment, the projector 100 functions as a display device for receiving the operation to the operation surface SS by the hand 90 of the user.

The projection lens 210 projects the projected screen PS on the operation surface SS. The projected screen PS includes an image drawn in the projector 100. When the image drawn in the projector 100 does not exist, the projector 100 irradiates the projected screen PS with light to display a white image. In the present specification, the "operation surface SS" means a surface used for inputting an operation using the hand 90 or the finger 80. Further, the "projected screen PS" means an area of an image projected on the operation surface SS by the projector 100.

The first camera 310 and the second camera 320 each have a function of capturing an image of the hand 90 with the operation surface SS as background. In other words, the first camera 310 and the second camera 320 each receive the light reflected by the operation surface SS and the hand 90 out of the infrared light emitted from the infrared illumination section 400 to thereby form the image including the hand 90. When using the two images respectively shot by the first camera 310 and the second camera 320, it is possible to obtain a three-dimensional position of the hand 90 or the finger 80 using triangulation or the like. The first camera 310 and the second camera 320 are arranged at respective positions different from each other in front of the operation surface SS so as to be able to capture the operation surface SS. It should be noted that the number of the cameras can also be three or more.

Figure 2:
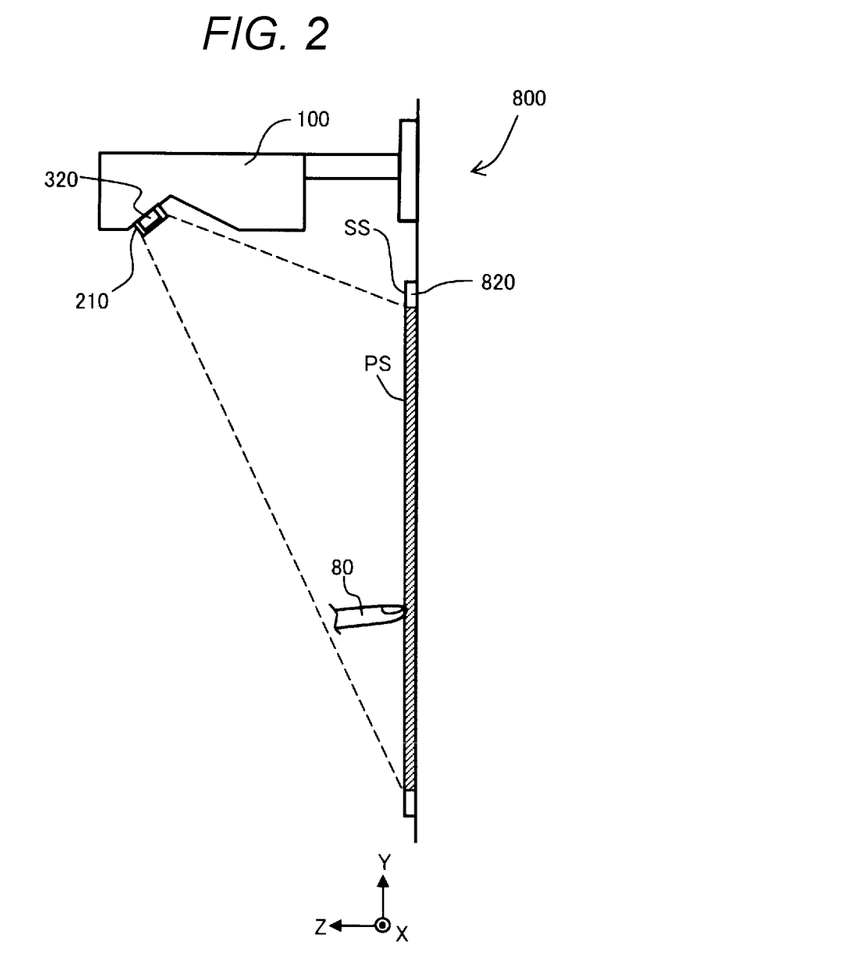
FIG. 2 is a side view of the interactive projection system.
Figure 3:
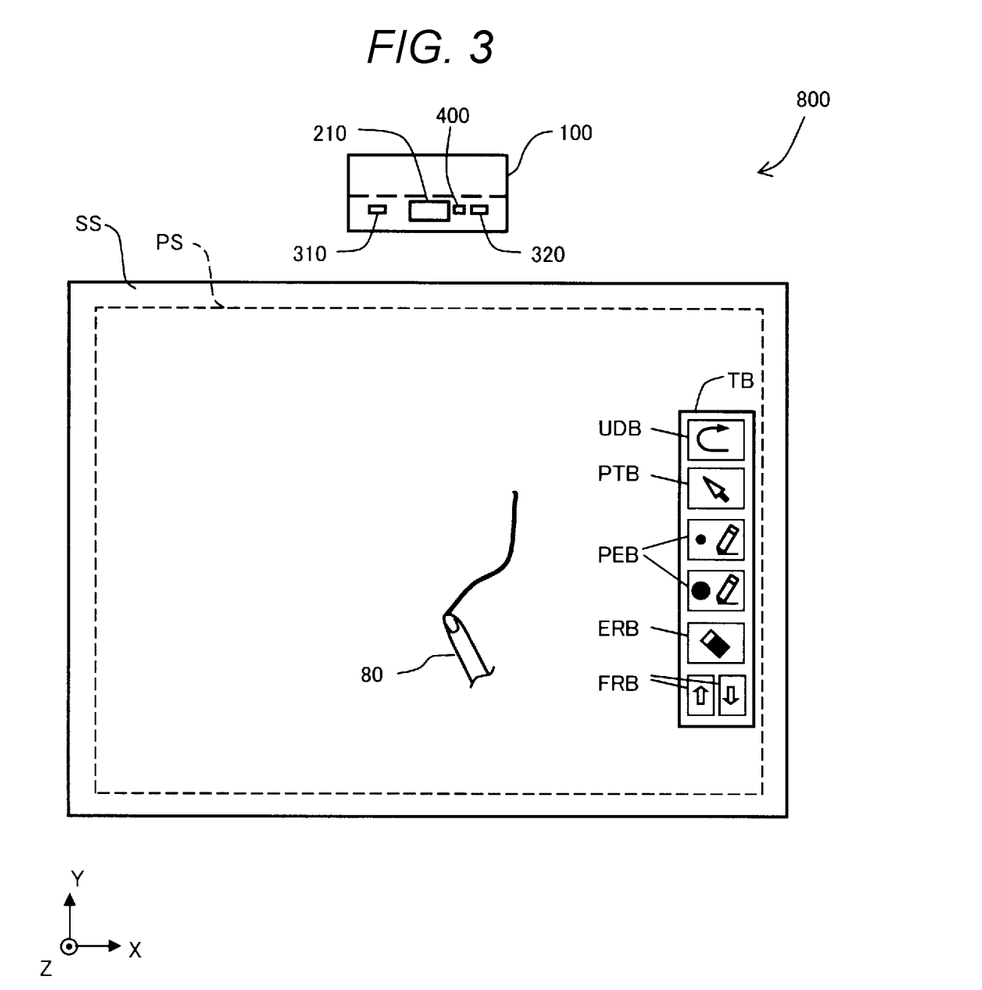
FIG. 3 is a front view of the interactive projection system.

FIG. 2 is a side view of the interactive projection system 800, and FIG. 3 is a front view thereof. In the present specification, a direction from a left end toward a right end of the operation surface SS is defined as an X direction, a direction from a lower end toward an upper end of the operation surface SS is defined as a Y direction, and a direction parallel to a normal line of the operation surface SS is defined as a Z direction. It should be noted that the X direction is also referred to as a "width direction," the Y direction is also referred to as an "upward direction," and the Z direction is also referred to as a "distance direction" for the sake of convenience. It should be noted that in FIG. 2, the range of the projected screen PS out of the screen plate 820 is provided with hatching for the sake of convenience of illustration.

The example shown in FIG. 3 represents the state in which the interactive projection system 800 operates in a whiteboard mode. The whiteboard mode is a mode in which the user can arbitrarily draw a picture on the projected screen PS using the hand 90 or the finger 80. The projected screen PS including a toolbox TB is projected on the operation surface SS. The toolbox TB includes a cancel button UDB for undoing the process, a pointer button PTB for selecting a mouse pointer, pen buttons PEB for selecting pen tools for performing drawing, an eraser button ERB for selecting an eraser tool for erasing the image having been drawn, and forward/backward buttons FRB for respectively feeding the screen forward and backward. By clicking these buttons using the finger 80, it is possible for the user to perform processes corresponding to the respective buttons, or to select tools corresponding to the respective buttons. It should be noted that it is also possible to arrange that the mouse pointer is selected as a default tool immediately after starting up the system 800. In the example shown in FIG. 3, there is described the process in which the user selects the pen tool, and then moves the tip of the finger 80 within the projected screen PS in the state of having contact with the operation surface SS to thereby draw a line in the projected screen PS. The drawing of the line is performed by a projection image generation section described later.

It should be noted that the interactive projection system 800 can operate in other modes than the whiteboard mode. For example, this system 800 can also operate in a PC interactive mode for displaying an image represented by the data having been transferred from a personal computer not shown via a communication line in the projected screen PS. In the PC interactive mode, an image represented by the data of, for example, spreadsheet software is displayed, and it becomes possible to perform input, generation, correction, and so on of the data using a variety of tools and operation icons displayed in the image.

Figure 4:
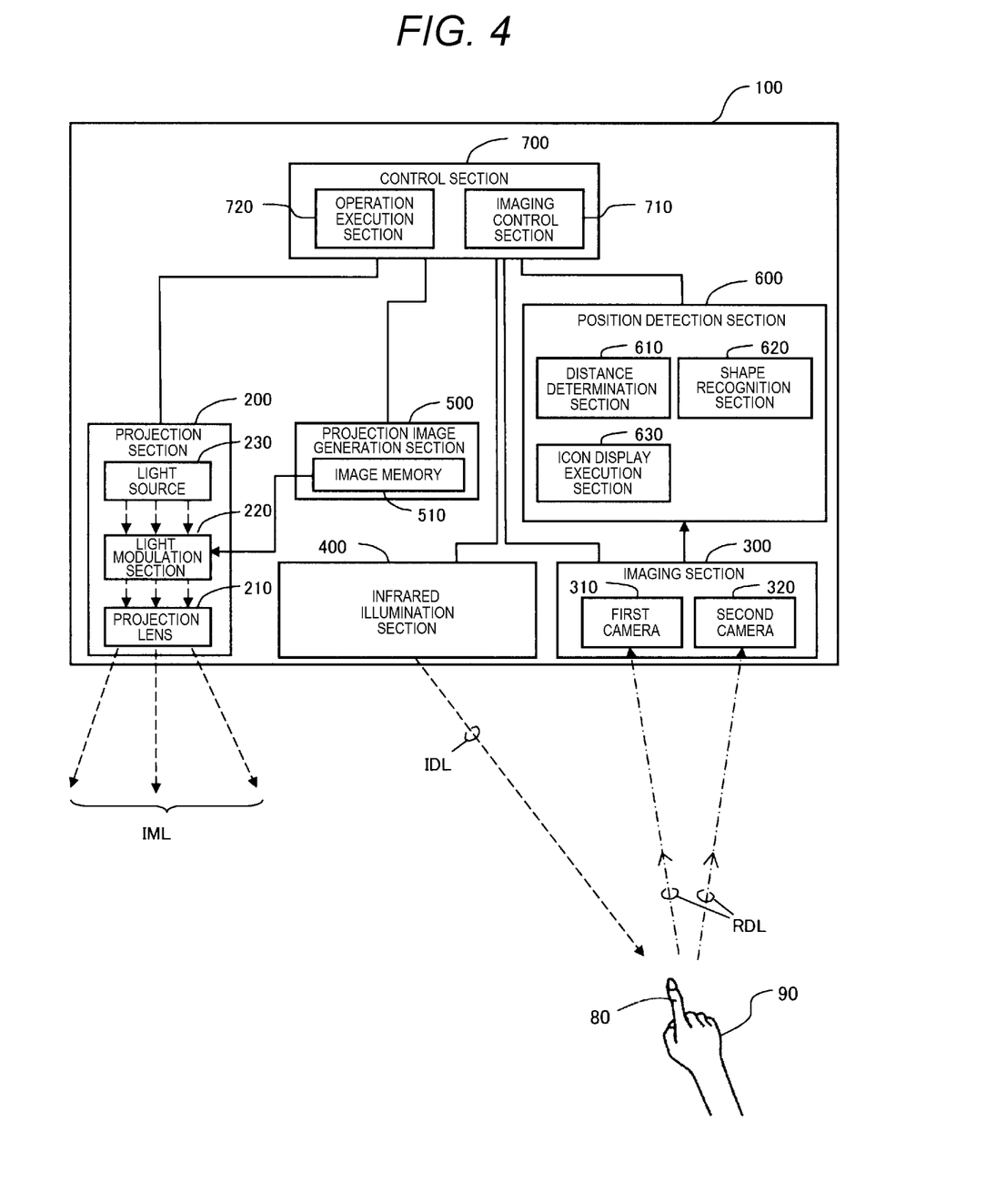
FIG. 4 is a functional block diagram of the interactive projector.

FIG. 4 is a functional block diagram of the interactive projector 100. The projector 100 has a control section 700, a projection section 200, a projection image generation section 500, a position detection section 600, an imaging section 300, and the infrared illumination section 400.

The control section 700 performs control of each of the sections of the projector 100. Further, the control section 700 has a function as an imaging control section 710 for taking an image of the hand 90 using the imaging section 300 and the infrared illumination section 400. Further, the control section 700 has a function as an operation execution section 720 which recognizes the content of the operation on the operation surface SS by the hand 90 or the finger 80 detected by the position detection section 600, and then instructs the projection image generation section 500 to generate or change the projection image representing the processing result corresponding to the operation.

The projection image generation section 500 has an image memory 510 for storing the projection image, and has a function of generating the projection image to be projected on the operation surface SS by the projection section 200. It is preferable for the projection image generation section 500 to be further provided with a function as a keystone distortion correction section for correcting a keystone distortion of the projected screen PS.

The projection section 200 has a function of projecting the projection image having been generated by the projection image generation section 500 on the operation surface SS. The projection section 200 has a light modulation section 220 and a light source 230 besides the projection lens 210 described with reference to FIG. 2. The light modulation section 220 modulates the light from the light source 230 in accordance with the projection image data provided from the image memory 510 to thereby form projection image light IML. The projection image light IML is typically color image light including the visible light of three colors of RGB, and is projected on the operation surface SS by the projection lens 210. It should be noted that as the light source 230, there can be adopted a variety of types of light sources such as a light emitting diode or a laser diode besides a light source lamp such as a super-high pressure mercury lamp. Further, as the light modulation section 220, there can be adopted a transmissive or reflective liquid crystal panel, a digital mirror device, and so on, and there can also be adopted a configuration provided with a plurality of light modulation sections 220 for the respective colored light beams.

The infrared illumination section 400 is capable of irradiating throughout the range from the operation surface SS to the space in front of the operation surface SS with irradiated detection light IDL for detecting the hand 90 and the finger 80. The irradiated detection light IDL is infrared light.

The imaging section 300 has the first camera 310 and the second camera 320 described with reference to FIG. 2. The two cameras 310, 320 each have a function of receiving light in the wavelength region including the wavelength of the irradiated detection light IDL to thereby perform imaging. In the example shown in FIG. 4, there is described the process in which the irradiated detection light IDL emitted by the infrared illumination section 400 is reflected by the hand 90 or the finger 80, and then the reflected detection light RDL is received by the two cameras 310, 320 to be imaged. It should be noted that as the cameras 310, 320, it is also possible to use what captures an image of visible light instead of an image of infrared light. In such a case, the infrared illumination section 400 can be omitted.

The position detection section 600 has a function of obtaining the three-dimensional position of a representative point of the hand 90 and the tip of the finger 80 using the images taken by the two cameras 310, 320. Further, the position detection section 600 includes a distance determination section 610, a shape recognition section 620, and an icon display execution section 630. The distance determination section 610 determines a distance between the hand 90 and the operation surface SS from the images shot by the cameras 310, 320. The determination of the distance is executed using, for example, triangulation. The shape recognition section 620 recognizes the shape of the hand 90 from the images shot by the cameras 310, 320. The recognition of the shape of the hand 90 is executed using, for example, pattern matching. When the hand 90 and the operation surface SS are in a separate state, the icon display execution section 630 makes the image display section perform an icon display process for displaying the operation icon selected in accordance with the shape of the hand 90 on the operation surface SS. In the present embodiment, the projection image generation section 500 and the projection section 200 correspond to an "image display section." The details of the functions of these sections 610 through 630 will be described later.

The functions of the sections of the control section 700 and the functions of the sections of the position detection section 600 are realized by, for example, a processor in the projector 100 executing a computer program. Further, it is also possible to realize some of the functions of these sections with a hardware circuit.

Figure 5:
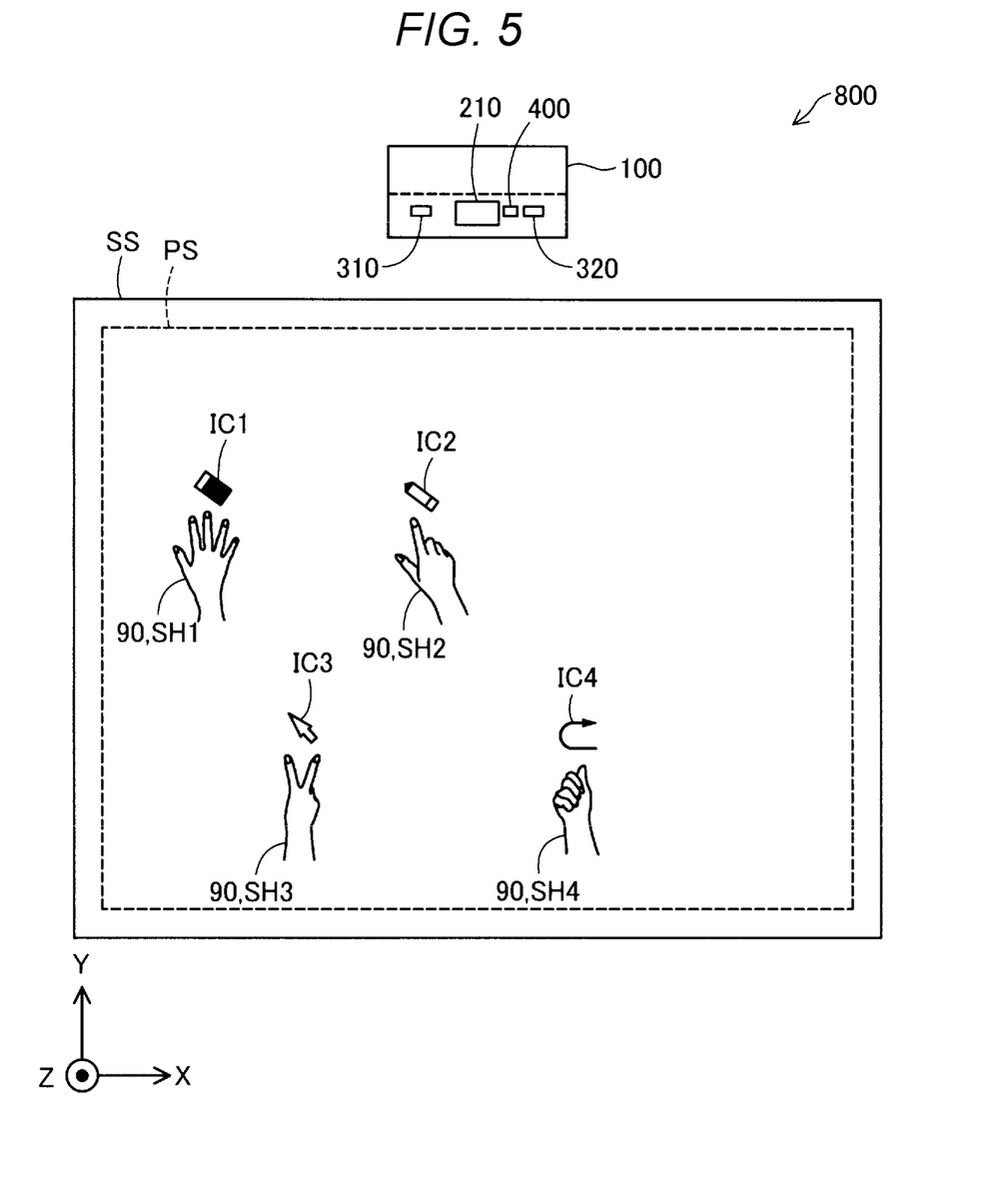
FIG. 5 is an explanatory diagram showing an example of operation icons to be displayed in accordance with the shapes of a hand.

FIG. 5 is an explanatory diagram showing an example of the operation icons to be displayed on the operation surface SS in accordance with the shape of the hand 90. In the present specification, the "operation icons" each denote an icon representing the content of the process to be executed by the operation of the hand 90 on the operation surface SS. Here, as the shape of the hand 90, there are shown four shapes SH1 through SH4 different from each other. Further, on the operation surface SS above the hand 90, there are displayed the operation icons IC1, IC2, IC3, and IC4 different from each other and preselected in accordance with the shapes SH1 through SH4 of the hand 90. The first operation icon IC1 is an operation icon representing the process of erasing the image having been drawn similarly to the eraser button ERB shown in FIG. 3. The second operation icon IC2 is an operation icon representing the drawing process with a pen similarly to the pen button PEB shown in FIG. 3. The third operation icon IC3 is an operation icon representing a process as a mouse pointer similarly to the pointer button PTB shown in FIG. 3. The fourth operation icon IC4 is an operation icon representing a cancel process for undoing the process similarly to the cancel button UDB shown in FIG. 3. In FIG. 3, the images of an "eraser," a "pen," a "pointer," and a "U-turn arrow" as the operation icons IC1, IC2, IC3, and IC4, respectively. The display of such operation icons IC1 through IC4 is performed by the shape recognition section 620 recognizing the shape of the hand 90, and the icon display execution section 630 making the image display section perform the process of displaying the operation icons IC1 through IC4 selected in accordance with the shapes SH1 through SH4 of the hand 90 on the operation surface SS when the hand 90 and the operation surface SS are in the separate state. Thus, since the operation icon selected in accordance with the shape of the hand 90 is displayed on the operation surface SS when the hand 90 is in the separate state in which the hand 90 is separated from the operation surface SS, it is possible for the user to easily realize what process can be performed in that shape of the hand 90. When the user makes the hand 90 approach the operation surface SS in an unchanged shape, and then the hand 90 has contact with the operation surface SS, the process corresponding to the operation icon IC1 through IC4 is performed. The processes corresponding to the operation icons IC1 through IC4 are processes to be performed at the position of the operation surface SS which the hand 90 has contact with, or processes performed regardless of the position on the operation surface SS the hand 90 has contact with. In the present embodiment, for example, when the projector 100 recognizes the shape of the hand 90 as the shape SH2, the projector 100 displays the second operation icon IC2 on the operation surface SS, and further, when the projector 100 recognizes the contact of the hand 90 with the operation surface SS, the projector 100 performs the drawing process at the position of the contact. Further, when the projector 100 recognizes the shape of the hand 90 as the shape SH4, the projector 100 displays the fourth operation icon IC4 on the operation surface SS, and further, when the projector 100 recognizes the contact of the hand 90 with the operation surface SS, the projector 100 performs the cancel process for undoing the process regardless of the position of the contact.

It is preferable for the two-dimensional coordinate X, Y of the operation icons IC1 through IC4 on the operation surface SS to be the same as the two-dimensional coordinate X, Y out of the three-dimensional coordinate X, Y, Z of the representative point of the hand 90 to be detected by the position detection section 600. This makes it possible for the user to easily recognize what position in the operation surface SS the process represented by that operation icon is to be performed on with the operation icon corresponding to the shape of the hand 90. It should be noted that as the representative point of the hand 90, it is possible to use, for example, the closest point to the operation surface SS out of the hand 90 or a point with the largest Y coordinate value out of the hand 90. As described later, the representative point of the hand 90 is also used when obtaining the distance between the hand 90 and the operation surface SS.

It should be noted that the correspondence relationship between the shapes SH1 through SH4 of the hand 90 and the operation icons IC1 through IC4 shown in FIG. 5 is an example, and it is possible to arbitrarily predetermine a correspondence relationship other than the above in advance. Further, it is also possible to arrange that the operation mode of displaying the toolbox TB as shown in FIG. 3 and then selecting a tool from the toolbox, and the operation mode of displaying the operation icon in accordance with the shape of the hand 90 as shown in FIG. 5 are switched in accordance with a specific shape and action of the hand 90. As the specific shape and action of the hand 90, it is possible to use an arbitrary action such as knocking the operation surface SS twice with the hand 90 shaped like "rock."

When the hand 90 and the operation surface SS are not in the separate state, in other words, when the hand 90 and the operation surface SS are in a contact state, it is possible for the operation icons IC1 through IC4 to be displayed or not to be displayed. For example, while the drawing process with a pen is in execution, when the image of the second operation icon IC2 corresponding thereto is displayed, there is a possibility that the image overlaps the image due to the drawing process, and thus, the operability for the user degrades. In this case, in the contact state, it is more preferable not to display the image of the second operation icon IC2. Further, when the image of the second operation icon IC2 is displayed, it is also possible to display the image of the second operation icon IC2 at a position not overlapping the image due to the drawing process.

When the hand 90 and the operation surface SS are in the contact state, it is possible for the shape recognition section 620 to continue the recognition of the shape of the hand 90, or stop the recognition thereof. For example, when the shape recognition section 620 stops the recognition of the shape of the hand 90, even if the shape of the hand 90 has changed in the contact state, it is preferable to perform the process corresponding to the shape of the hand 90 which has previously been recognized by the shape recognition section 620. When the shape recognition section 620 continues the recognition of the shape of the hand 90, the process corresponding to the shape of the hand 90 which has been recognized by the shape recognition section 620 can be performed in each case in accordance with the change in shape of the hand 90 in the contact state. In these cases, it is preferable to display the operation icons even in the contact state.

The icon display execution section 630 can be arranged to further change the display configuration of the operation icon selected in accordance with the distance between the hand 90 and the operation surface SS. This makes it possible to display the operation icon in a configuration easy to be recognized by the user in accordance with the distance between the hand 90 and the operation surface SS. As modified examples of the display configuration of the operation icon, the following can be cited, for example.

(1) When the distance between the hand 90 and the operation surface SS is short, the operation icon is displayed in a smaller size than when the distance between the hand 90 and the operation surface SS is long.

(2) The operation icon is displayed with the tilt changed in accordance with the distance between the hand 90 and the operation surface SS.

(3) The operation icon is displayed with the shape and the color changed in accordance with the distance between the hand 90 and the operation surface SS.

It should be noted that the "distance between the hand 90 and the operation surface SS" means the distance between the representative point of the hand 90 and the operation surface SS in a direction along the normal line of the operation surface SS. Further, the "distance between the hand 90 and the operation surface SS" is also referred to as a "first distance" or a "distance $\Delta Z$."

Figure 6:
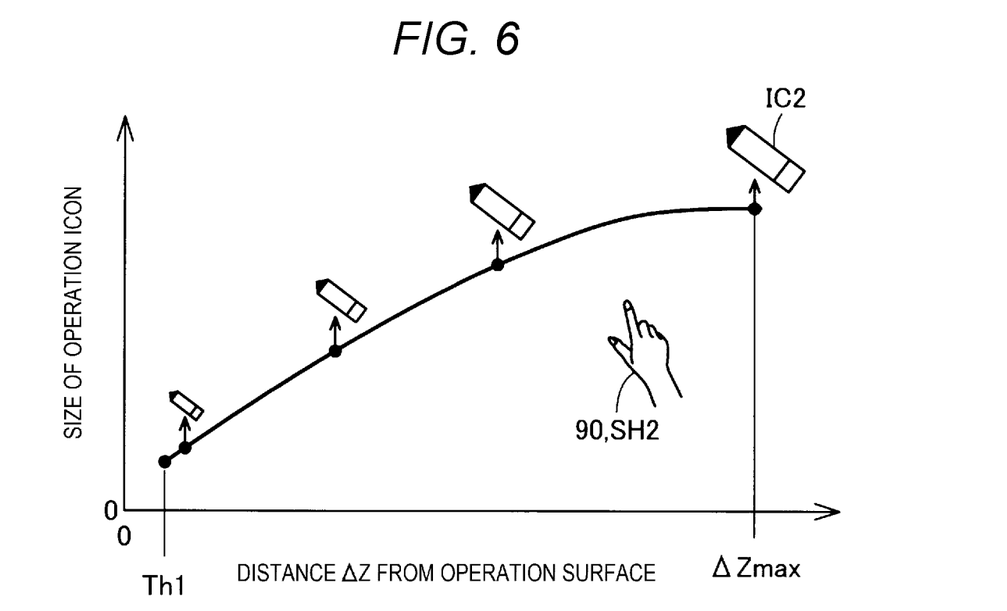
FIG. 6 is a graph showing an example of a change in size of the operation icon in accordance with a distance between the hand and an operation surface.

FIG. 6 is a graph showing an example of a change in size of the operation icon in accordance with the distance between the hand 90 and the operation surface SS. The horizontal axis represents the distance $\Delta Z$ between the hand and the operation surface SS, and the vertical axis represents the size of the operation icon. In this example, in the case of the separate state in which the distance $\Delta Z$ exceeds a first distance threshold value Th1 determined in advance, the shape of the hand 90 is recognized as the shape SH2, and the image of the "pen" as the operation icon IC2 corresponding to the shape SH2 is displayed on the operation surface SS. Further, the longer the distance $\Delta Z$ is, the larger the size of the operation icon IC2 becomes. In other words, when the distance $\Delta Z$ between the hand 90 and the operation surface SS is short, the operation icon IC2 is displayed in a smaller size than when the distance $\Delta Z$ between the hand 90 and the operation surface SS is long. The size of the operation icon IC2 can be arranged to continuously decrease in accordance with the decrease in the distance $\Delta Z$, or arranged to decrease in a step-like manner. By displaying the operation icon in a smaller size when the distance $\Delta Z$ between the hand 90 and the operation surface SS is short than when the distance $\Delta Z$ is long as described above, the user has an advantage of making it easy to recognize the position on the operation surface SS of the operation by the hand 90.

It should be noted that when the distance $\Delta Z$ exceeds the upper limit value $\Delta Z$max, it is preferable not to display the operation icon IC2 on the operation surface SS. This makes it possible to prevent unnecessary operation icons from being displayed on the operation surface SS when the hand 90 is significantly distant from the operation surface SS.

Figure 7:
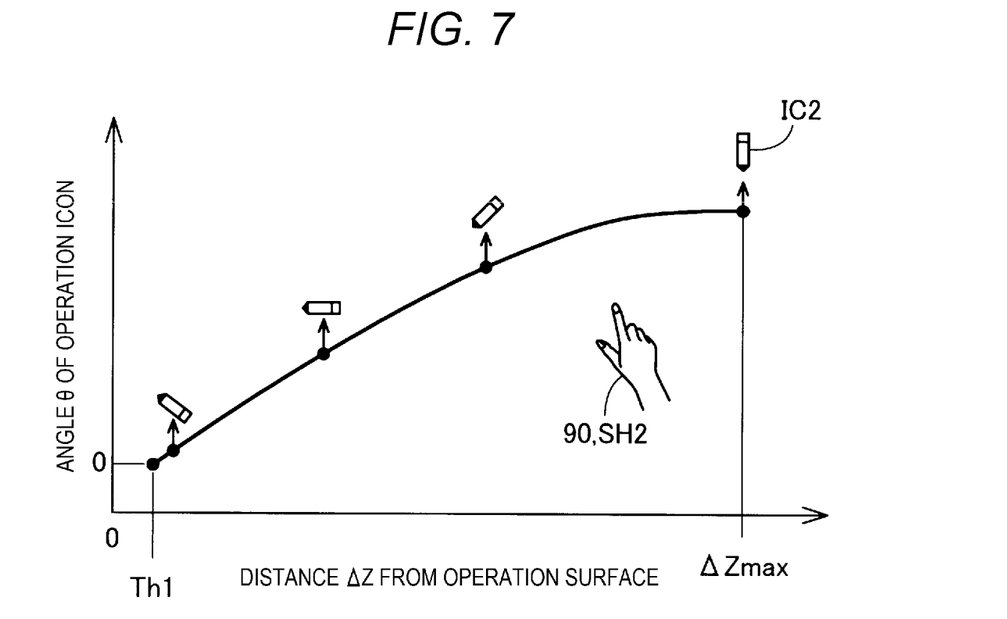
FIG. 7 is a graph showing an example of a change in angle of the operation icon in accordance with the distance between the hand and the operation surface.

FIG. 7 is a graph showing an example of a change in angle of the operation icon in accordance with the distance between the hand 90 and the operation surface SS. The horizontal axis represents the distance $\Delta Z$ between the hand and the operation surface SS, and the vertical axis represents the angle $\theta$ of the operation icon. Also in this example, similarly to FIG. 6, in the case of the separate state in which the distance $\Delta Z$ exceeds the first distance threshold value Th1 determined in advance, the shape of the hand 90 is recognized as the shape SH2, and the image of the "pen" as the operation icon IC2 corresponding to the shape SH2 is displayed on the operation surface SS. Further, when the distance $\Delta Z$ exceeds the upper limit value $\Delta Z$max, the operation icon IC2 is not displayed on the operation surface SS. The angle $\theta$ of the operation icon IC2 changes in accordance with the increase in the distance $\Delta Z$. The angle $\theta$ is defined as 0 degree when the pen tip of the operation icon IC2 shaped like a pen faces to the left, and the angle $\theta$ is arranged to increase as the pen tip of the operation icon IC2 rotates clockwise therefrom. The angle $\theta$ of the operation icon IC2 can be arranged to continuously increase in accordance with the increase in the distance $\Delta Z$, or arranged to increase in a step-like manner. Further, the angle $\theta$ of the operation icon IC2 can be arranged to decrease continuously or in a step-like manner in accordance with the increase in the distance $\Delta Z$. As described above, by changing the tilt of the operation icon in accordance with the distance $\Delta Z$ between the hand 90 and the operation surface SS, there is obtained an advantage that the position on the operation surface SS of the operation by the hand 90 can be made easy to be recognized.

Figure 8:
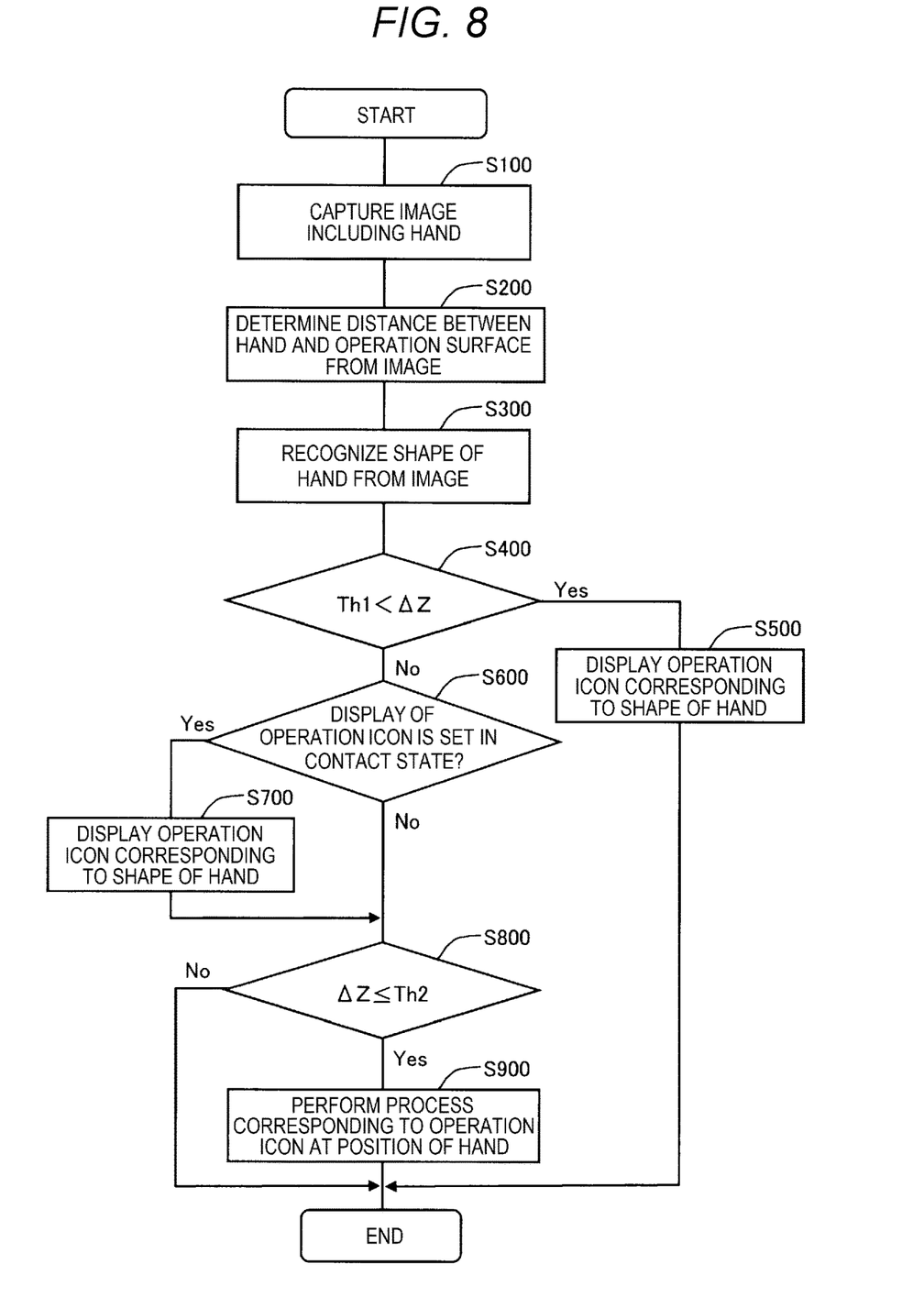
FIG. 8 is a flowchart showing a procedure of a display process.

FIG. 8 is a flowchart showing a procedure of the display process in the first embodiment. This process is repeatedly performed during the operation of the interactive projection system 800.

In the step S100, by the imaging section 300 capturing the hand 90 with the operation surface SS as a background, the image including the hand 90 is obtained. In the present embodiment, there are obtained two images using the two cameras 310, 320. In the step S200, the distance determination section 610 determines the distance $\Delta Z$ between the hand 90 and the operation surface SS from the images obtained in the step S100. The determination of the distance is performed using, for example, triangulation using the two images. It should be noted that it is also possible to arrange that the two-dimensional coordinate X, Y of the hand 90 is also obtained at the same time in the step S200. In the step S300, the shape recognition section 620 recognizes the shape of the hand 90 from the images obtained in the step S100. This recognition is performed using, for example, pattern matching.

In the step S400, there is determined whether or not the distance $\Delta Z$ between the hand 90 and the operation surface SS exceeds the first distance threshold value Th1 determined in advance. In the case of the separate state in which the distance $\Delta Z$ exceeds the first distance threshold value Th1, the process proceeds to the step S500, and the icon display execution section 630 makes the image display section perform the icon display process for displaying the operation icon selected in accordance with the shape of the hand 90 from the plurality of operation icons on the operation surface SS.

In contrast, when the distance $\Delta Z$ is equal to or smaller than the first distance threshold value Th1, the process proceeds to the step S600, whether or not the display of the operation icon is set in the contact state is determined. When the display of the operation icon is set in the contact state, the process proceeds from the step S600 to the step S700. In the step S700, the operation execution section 720 performs the process represented by the operation icon having been selected in accordance with the shape of the hand 90 at the position of the hand 90 on the operation surface SS. When the display of the operation icon is not set in the contact state, the process proceeds to the step S800.

In the step S800, whether or not the distance ΔZ is equal to or smaller than a second distance threshold value Th2 is determined. When the distance ΔZ is larger than the second distance threshold value Th2, the process shown in FIG. 8 is terminated. In contrast, when the distance ΔZ is equal to or smaller than the second distance threshold value Th2, the process proceeds to the step S900, and the operation execution section 720 performs the process represented by the operation icon having been selected in accordance with the shape of the hand 90 at the position of the hand 90 on the operation surface SS. Here, the "position of the hand 90" means the position of the representative point of the hand 90. As described above, the representative point of the hand 90 is, for example, the closest point to the operation surface SS out of the hand 90.

The first distance threshold value Th1 is a value with which it is possible to determine that the hand 90 is separated from the operation surface SS, and is set in a range of, for example, 5 through 20 mm. Further, the second distance threshold value Th2 is a value with which it is possible to determine that the hand 90 is extremely close to the operation surface SS, and is set in a range of, for example, 3 through 5 mm. The second distance threshold value Th2 is set to a value equal to or smaller than the first distance threshold value Th1. It should be noted that it is also possible to set the two distance threshold values Th1, Th2 to the same value. In this case, the step S900 is omitted. The separate state in which the first distance ΔZ exceeds the first distance threshold value Th1 is referred to as the "separate state of the hand 90 and the operation surface SS." The state in which the first distance ΔZ is equal to or smaller than the second distance threshold value Th2 is referred to as the "contact state of the hand 90 and the operation surface SS." When setting the first distance threshold value Th1 and the second distance threshold value Th2 to be equal to each other, a state other than the "separate state of the hand 90 and the operation surface SS" corresponds to the "contact state of the hand 90 and the operation surface SS."

As described above, in the first embodiment, since the operation icon selected in accordance with the shape of the hand 90 is displayed on the operation surface SS when the hand 90 is in the separate state in which the hand 90 is separated from the operation surface SS, it is possible for the user to easily realize what process can be performed in that shape of the hand 90.

B. Second Embodiment

Figure 9:
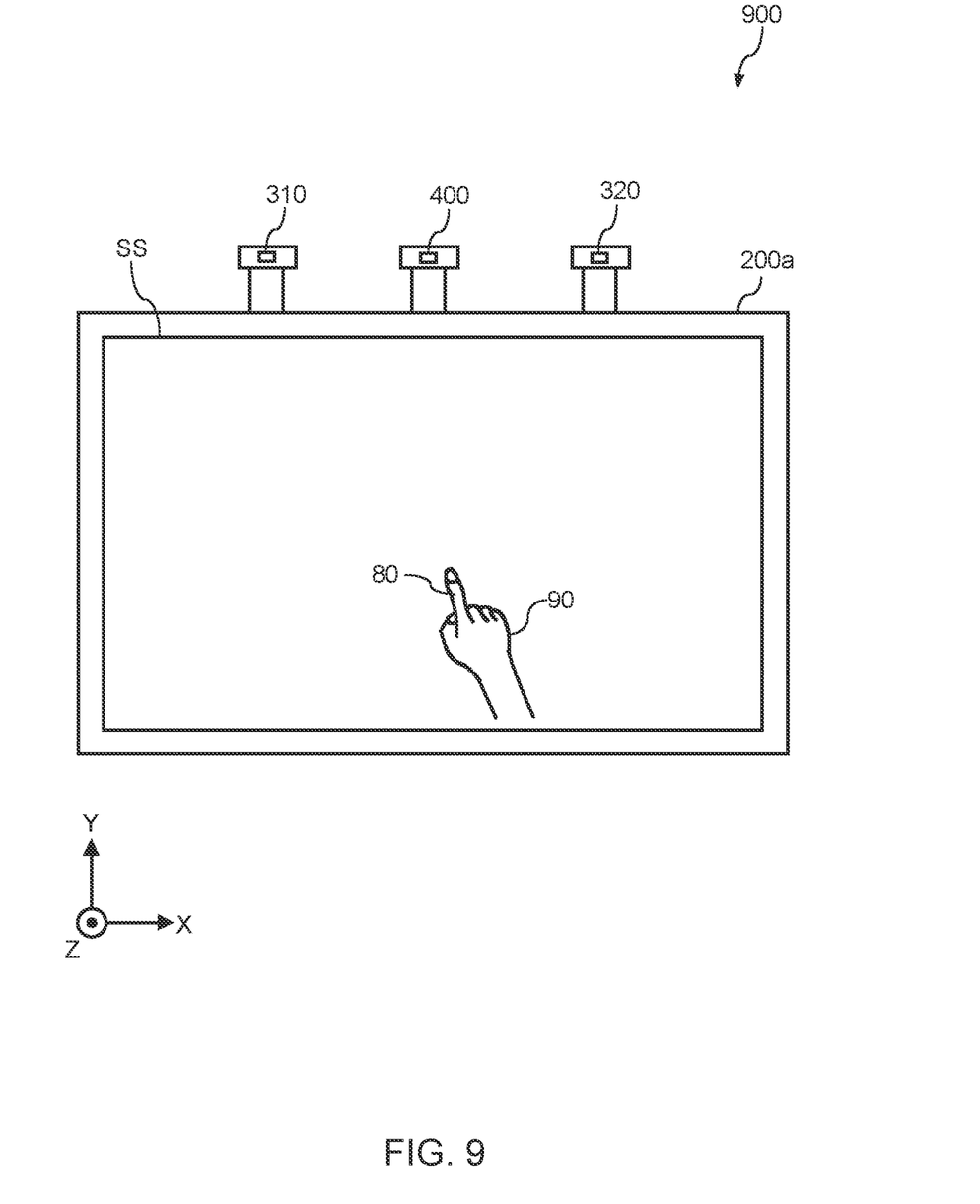
FIG. 9 is a front view of a display system in a second embodiment.

FIG. 9 is a front view of a display system 900 in a second embodiment. The display system 900 has an image display panel 200a, the two cameras 310, 320 for capturing the image including the hand 90, and the infrared illumination section 400. The configuration of the cameras 310, 320 and the infrared illumination section 400 is the same as the configuration of these constituents in the first embodiment. The image display panel 200a is a so-called flat panel display. The image display surface of the image display panel 200a corresponds to the operation surface SS.

Figure 10:
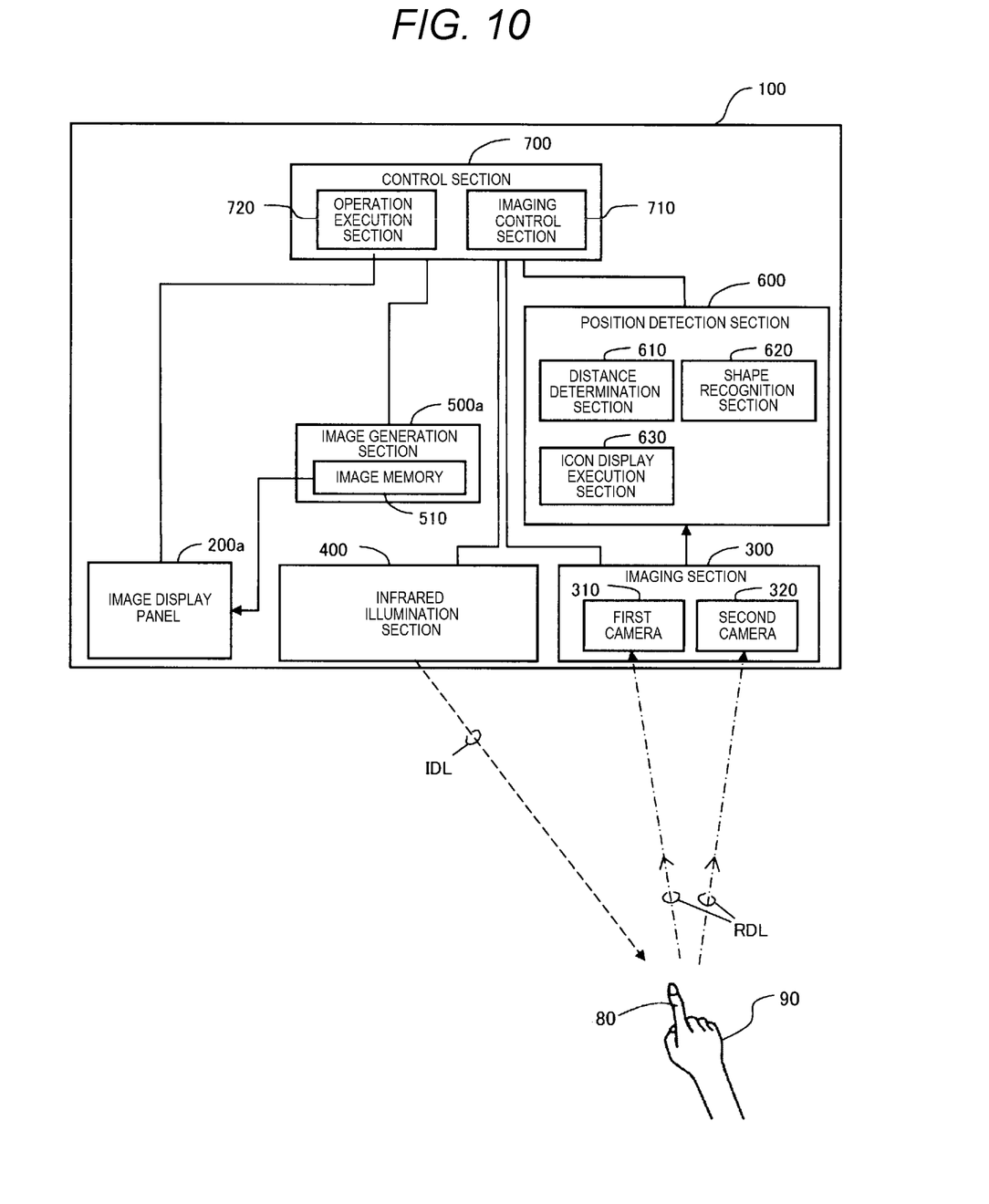
FIG. 10 is a functional block diagram of the display system.

FIG. 10 is a functional block diagram of the display system 900. The display system 900 is obtained by changing the projection section 200 to the image display panel 200a, and the projection image generation section 500 to an image generation section 500a out of the constituents of the interactive projector 100 shown in FIG. 4, and the rest of the configurations are the same as those of the interactive projector 100. Further, the process by the display system 900 is substantially the same as the process in the first embodiment described with reference to FIG. 5 through FIG. 8, and therefore, the description will be omitted. Further, the second embodiment also exerts substantially the same advantages as in the first embodiment.

Although in the first embodiment and the second embodiment described above, the images of the hand 90 and the finger 80 are obtained using the two cameras 310, 320, it is also possible to obtain the images of the hand 90 using other imaging devices. It is also possible to obtain the image of the hand 90 using a camera capable of measuring a three-dimensional position using time of flight of light such as a TOF camera (Time-of-Flight Camera). Further, it is also possible to obtain the image of the hand 90 and the finger 80 using a monocular camera. In this case, it is also possible to measure the two-dimensional coordinate X, Y or the three-dimensional coordinate X, Y, Z of the hand 90 and the finger 80 using other position detection devices such as a light curtain touch module.

C. Other Embodiments

The present disclosure is not limited to the embodiments described above, but can be implemented in a variety of aspects within the scope or the spirit of the disclosure. For example, the present disclosure can also be implemented in the following aspect. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to a first aspect of the present disclosure, there is provided a display method of receiving an operation to an operation surface with a hand of a user. The display method includes (a) capturing an image including the hand, (b) determining a first distance as a distance between the hand and the operation surface, (c) recognizing a shape of the hand based on the image, and (d) displaying an operation icon selected in accordance with the shape of the hand out of a plurality of operation icons on the operation surface in a case of a separate state in which the first distance exceeds a first distance threshold value determined in advance.

According to the present display method, since the operation icon selected in accordance with the shape of the hand is displayed on the operation surface when the hand is in the separate state in which the hand is separated from the operation surface, it is possible for the user to easily realize what process can be performed in that shape of the hand.

(2) In the display method described above, the step (d) may include changing a display configuration of the selected operation icon in accordance with the first distance.

According to the present display method, it is possible to display the operation icon in a configuration easy to be recognized by the user in accordance with the distance between the hand and the operation surface.

(3) In the display method described above, the step (d) may include displaying, when the first distance is short, the selected operation icon in a smaller size than when the first distance is long.

According to the present display method, since the operation icon can be displayed in a smaller size when the distance between the hand and the operation surface is short than when the distance is long, it is possible to make it easy to recognize the position on the operation surface of the operation by the hand.

(4) In the display method described above, the step (d) may include changing a tilt of the selected operation icon in accordance with the first distance.

According to the present display method, since the tilt of the operation icon is changed in accordance with the distance between the hand and the operation surface, it is possible to make it easy to recognize the position on the operation surface of the operation by the hand.

(5) In the display method described above, there may further be included (e) determining that the hand and the operation surface are in a contact state to perform a process represented by the operation icon when the first distance is no more than a second distance threshold value determined in advance as a value no more than the first distance threshold value.

According to the present display method, it is possible to perform the process corresponding to the shape of the hand.

(6) In the display method described above, the step (e) may include performing a process represented by the operation icon at a position on the operation surface determined to be in the contact state and displaying the operation icon at a position different from the position on the operation surface determined to be in the contact state.

According to the present display method, since the execution position of the process represented by the operation icon and the position of the operation icon are different from each other, it is possible to decrease the possibility that the operability by the user deteriorates during the execution of the process corresponding to the operation icon.

(7) In the display method described above, the step (e) may include displaying the operation icon on the operation surface without changing the operation icon despite a change in shape of the hand to perform the process represented by the operation icon.

According to the present display method, it is possible to decrease the possibility that the operation icon is changed due to a small change in shape of the hand.

(8) According to a second aspect of the present disclosure, there is provided a display device for receiving an operation to an operation surface by a hand of a user. The display device includes an image display section configured to display a display image on the operation surface, a camera configured to capture an image including the hand, a distance determination section configured to determine a first distance as a distance between the hand and the operation surface, a shape recognition section configured to recognize a shape of the hand based on the image, and an icon display execution section configured to make the image display section perform an icon display process of displaying an operation icon selected in accordance with the shape of the hand out of a plurality of operation icons on the operation surface in a case of a separate state in which the first distance exceeds a first distance threshold value determined in advance.

According to the present display device, since the operation icon selected in accordance with the shape of the hand is displayed on the operation surface when the hand is in the separate state in which the hand is separated from the operation surface, it is possible for the user to easily realize what process can be performed in that shape of the hand.

(9) In the display device described above, the icon display execution section may change a display configuration of the selected operation icon in accordance with the first distance.

According to the present display device, it is possible to display the operation icon in a configuration easy to be recognized by the user in accordance with the distance between the hand and the operation surface.

(10) In the display device described above, the icon display execution section may display, when the first distance is short, the selected operation icon in a smaller size than when the first distance is long.

According to the present display device, since the operation icon can be displayed in a smaller size when the distance between the hand and the operation surface is short than when the distance is long, it is possible to make it easy to recognize the position on the operation surface of the operation by the hand.

(11) In the display device described above, the icon display execution section may change a tilt of the selected operation icon in accordance with the first distance.

According to the present display device, since the tilt of the operation icon is changed in accordance with the distance between the hand and the operation surface, it is possible to make it easy to recognize the position on the operation surface of the operation by the hand.

(12) According to a third aspect of the present disclosure, there is provided an interactive projector for receiving an operation to an operation surface by a hand of a user. The interactive projector includes a projection section configured to project a projection image on the projection surface, a camera configured to capture an image including the hand, a distance determination section configured to determine a first distance as a distance between the hand and the operation surface, a shape recognition section configured to recognize a shape of the hand based on the image, and an icon display execution section configured to make the projection section perform an icon display process of displaying an operation icon selected in accordance with the shape of the hand out of a plurality of operation icons on the operation surface in a case of a separate state in which the first distance exceeds a first distance threshold value determined in advance.

According to the present interactive projector, since the operation icon selected in accordance with the shape of the hand is displayed on the operation surface when the hand is in the separate state in which the hand is separated from the operation surface, it is possible for the user to easily realize what process can be performed in that shape of the hand.

What is claimed is:

1. A display method configured to receive an operation to an operation surface by a hand of a user, comprising:
   capturing an image including the hand;
   determining a first distance as a distance between the hand and the operation surface;
   recognizing a shape of the hand based on the image; and
   displaying, on the operation surface, an operation icon selected from a plurality of operations icons based on the shape of the hand in a case of a separate state in which the first distance exceeds a first distance threshold value determined in advance, each of the plurality of operations icons comprising an image indicative of a different process to be executed by the hand on the operation surface.

2. The display method according to claim 1, wherein displaying the operation icon includes changing a display configuration of the operation icon in accordance with the first distance.

3. The display method according to claim 2, wherein changing the display configuration of the operation icon includes displaying, when the first distance is short, the operation icon in a smaller size than when the first distance is long.

4. The display method according to claim 2, wherein changing the display configuration of the operation icon includes changing a tilt of the operation icon in accordance with the first distance.

5. The display method according to claim 1, further comprising:
determining that the hand and the operation surface are in a contact state to perform a process represented by the operation icon when the first distance is no more than a second distance threshold value determined in advance as a value no more than the first distance threshold value.

6. The display method according to claim 5, further comprising:
responsive to determining the hand and the operation surface are in the contact state, performing the process represented by the operation icon at a position on the operation surface determined to be in the contact state and displaying the operation icon at a position different from the position on the operation surface determined to be in the contact state.

7. The display method according to claim 5, further comprising:
responsive to determining the hand and the operation surface are in the contact state, displaying the operation icon on the operation surface without changing the operation icon despite a change in shape of the hand to perform the process represented by the operation icon.

8. The display method according to claim 1, wherein a first operation icon of the plurality of operation icons comprises an image of an eraser.

9. The display method according to claim 1, wherein a first operation icon of the plurality of operation icons comprises an image of a pen.

10. The display method according to claim 1, wherein a first operation icon of the plurality of operation icons comprises an image of a U-turn arrow.

11. The display method according to claim 1, wherein a first operation icon of the plurality of operation icons comprises an image of a pointer.

12. A display device configured to receive an operation to an operation surface by a hand of a user, comprising:
an image display section configured to display a display image on the operation surface;
a camera configured to capture an image including the hand; and
one or more processors configured to perform operations, the operations comprising:
obtaining the image including the hand;
determining a first distance as a distance between the hand and the operation surface;
recognizing a shape of the hand based on the image;
displaying, on the operation surface, an operation icon selected from a plurality of operation icons based on the shape of the hand in a case of a separate state in which the first distance exceeds a first distance threshold value determined in advance, each of the plurality of operations icons comprising an image indicative of a different process to be executed by the hand on the operation surface.

13. The display device according to claim 12, wherein the operation of displaying comprises changing a display configuration of the operation icon in accordance with the first distance.

14. The display device according to claim 13, wherein the the operation of changing the display configuration of the operation icon comprises displaying, when the first distance is short, the operation icon in a smaller size than when the first distance is long.

15. The display device according to claim 13, wherein the the operation of changing the display configuration comprises changing a tilt of the operation icon in accordance with the first distance.

16. An interactive projector configured to receive an operation to an operation surface by a hand of a user, comprising:
a projection section configured to project a projection image on the operation surface;
a camera configured to capture an image including the hand; and
one or more processors configured to perform operations, the operations comprising:
obtaining the image including the hand;
determining a first distance as a distance between the hand and the operation surface;
recognizing a shape of the hand based on the image; and
displaying, on the operation surface, an operation icon selected from a plurality of operation icons based on the shape of the hand in a case of a separate state in which the first distance exceeds a first distance threshold value determined in advance, each of the plurality of operations icons comprising an image indicative of a different process to be executed by the hand on the operation surface.

* * * * *